United States Patent [19]

Breglia et al.

[11] 4,439,157

[45] Mar. 27, 1984

[54] HELMET MOUNTED DISPLAY PROJECTOR

[75] Inventors: Denis R. Breglia, Altamonte Springs, Fla.; Daniel R. Lobb, Kent, England; Archer M. Spooner, Orlando, Fla.

[73] Assignee: The United states of America as represented by the Secretary of the Navy, Washington, D.C.

[21] Appl. No.: 374,575

[22] Filed: May 3, 1982

[51] Int. Cl.³ .............................................. G09B 9/08
[52] U.S. Cl. ..................................... 434/40; 434/44; 350/174
[58] Field of Search .................. 434/35, 38, 43, 44; 358/104; 350/174

[56] References Cited

U.S. PATENT DOCUMENTS

| | | | |
|---|---|---|---|
| 3,128,623 | 4/1964 | Gold | 350/174 |
| 4,048,653 | 9/1977 | Spooner | 434/43 |
| 4,174,150 | 11/1979 | Congleton | 350/174 |
| 4,315,240 | 2/1982 | Spooner | 434/44 |
| 4,315,241 | 2/1982 | Spooner | 434/44 |
| 4,340,878 | 7/1982 | Spooner et al. | 434/44 |
| 4,347,507 | 8/1982 | Spooner | 434/44 |
| 4,347,508 | 8/1982 | Spooner | 434/44 |
| 4,348,185 | 9/1982 | Breglia et al. | 434/43 |
| 4,348,186 | 9/1982 | Harvey et al. | 434/44 |
| 4,349,815 | 9/1982 | Spooner | 434/44 |
| 4,383,729 | 5/1983 | Suzuki et al. | 350/174 |

*Primary Examiner*—Richard C. Pinkham
*Assistant Examiner*—Leo P. Picard
*Attorney, Agent, or Firm*—Robert F. Beers; Robert W. Adams; Robert J. Veal

[57] ABSTRACT

A helmet mounted projector provides offset and frame scanning capabilities for a dual channel computer generated image simulation system. The projector receives full color lasers from each channel via a separate optical path, including galvanometer controlled line scan offset mirrors designed to provide eye tracking capabilities, and combines said channels along a single optical axis to provide coordinated frame scanning from the complex image produced by the combined rasters.

8 Claims, 3 Drawing Figures

HELMET MOUNTED DISPLAY PROJECTOR

BACKGROUND OF THE INVENTION

1. Field of the Invention

The present invention relates to visual simulator devices and particularly to visual simulation devices utilizing helmet mounted projectors. More particularly, the present invention relates to a helmet mounted visual simulation device for projecting computer generated images onto a domed screen utilizing a laser raster scan. In greater particularity, the present invention may be described as a helmet mounted optical scanning assembly for deflecting modulated laser rasters to produce images on a retroreflective screen.

2. Description of the Prior Art

The training of pilots in ground based simulators to perform mission tanks such as air-to-ground weapon delivery, low level high speed navigation, and confined area maneuvering requires wide angle presentation of a simulated real world environment.

Previous techniques have included the use of a large number of display channels in a mosaic arrangement about the observer. The number of display windows or channels required for such an approach is a function of the desired field of view, resolution, and the number of picture elements which can be provided by a window. A field of view requirement of two-thirds of a complete sphere combined with a resolution requirement for picture elements to subtend two arc minutes would require more than thirty display windows, thus requiring an image generator with more than thirty channels.

Alternatively, a helmet mounted display generator in a small CRT coupled directly to the observer's eye may be used. By appropriate means for sensing the observer's head direction, a display "window" which follows the observer's head direction can be generated. The disadvantage of such a system is the limited field of view available to the observer at any one head position.

SUMMARY OF THE INVENTION

The present invention is a sub-assembly in a visual simulator system designed to take advantage of the perceptual limitation of the observer. The system utilizes two channels of computer generated imagery: one to provide an instantaneous field of view, and the other to provide a smaller area of interest of higher resolution within said instantaneous field of view. The present invention uses a plurality of galvanometer controlled flat mirrors in conjunction with a compound lens system to convert line scan images from the two computer image generator channels into rasters, which are then combined into a composite frame. The invention then provides means for offsetting the composite frame to follow eye movements and to compensate for computational lag in the Computer Image Generator.

Thus, it is an object of the present invention to provide a helmet mounted system for converting a plurality of line scans into frame rasters.

It is a further object of the invention to provide a composite raster frame having an area of interest of high resolution surrounded by an instantaneous field of view of lesser resolution.

It is the object of the invention to provide a composite display, by achieving the above objects, which will provide the observer with a field of view closely matching his own optical limitations.

The foregoing and other objects, features and advantages of the invention, and a better understanding of its construction and operation will become apparent from the following detailed description taken in conjunction with the accompanying drawings.

DESCRIPTION OF THE PREFERRED EMBODIMENT

The visual simulation concept is based on the premise that a composite display consisting of an eye tracked Area of Interest (AOI) surrounded by a head tracked instantaneous field of view (IFOV) would be perceived by the observer as having high resolution throughout his available field of view.

The AOI and the IFOV are each produced by a full color laser raster. The composite display is projected from the observer's helmet through a single projection lens onto a retroreflective spherical screen. Each laser is modulated in accordance with the appropriate images generated by a dual channel computer image generator (CIG). The lasers, modulators, CIG, and line scanner apparatus are located remote from the observer. The modulated laser scan lines are relayed to the observer's helmet by a flexible optical link, preferably a fiber optics bundle.

Figure 1:
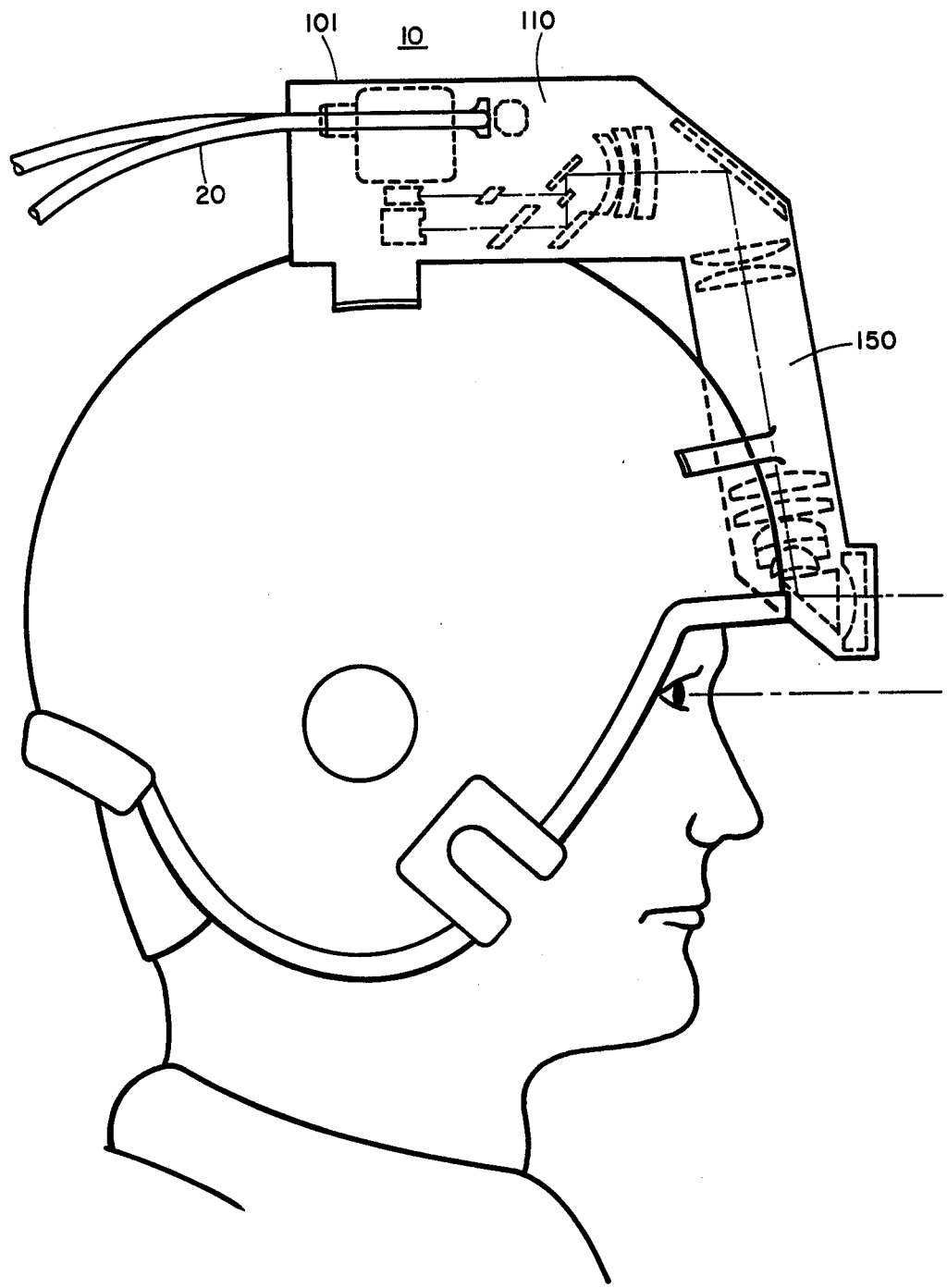
FIG. 1 is an illustration of the helmet mounted projector optics in relation to an observer.

The present invention is a helmet mounted optics system 10 depicted in FIG. 1. Helmet mounted optics system 10 converts the two laser scan lines into two rasters, combines the two rasters into a single composite frame, offsets the composite frame to follow eye movements and to compensate for computational lag in the CIG, and projects the composite display onto a retroreflective screen.

The remaining components of the visual simulation system include a head attitude sensor and an eye attitude sensor.

In FIG. 1, a pair of fiber optic bundles 20 are shown entering the projector housing 101 from the rear. Within housing 101, helmet mounted optics system 10 comprises a frame scan and eye following deflector assembly 110 and a wide angle projection optics assembly 150.

Figure 2:
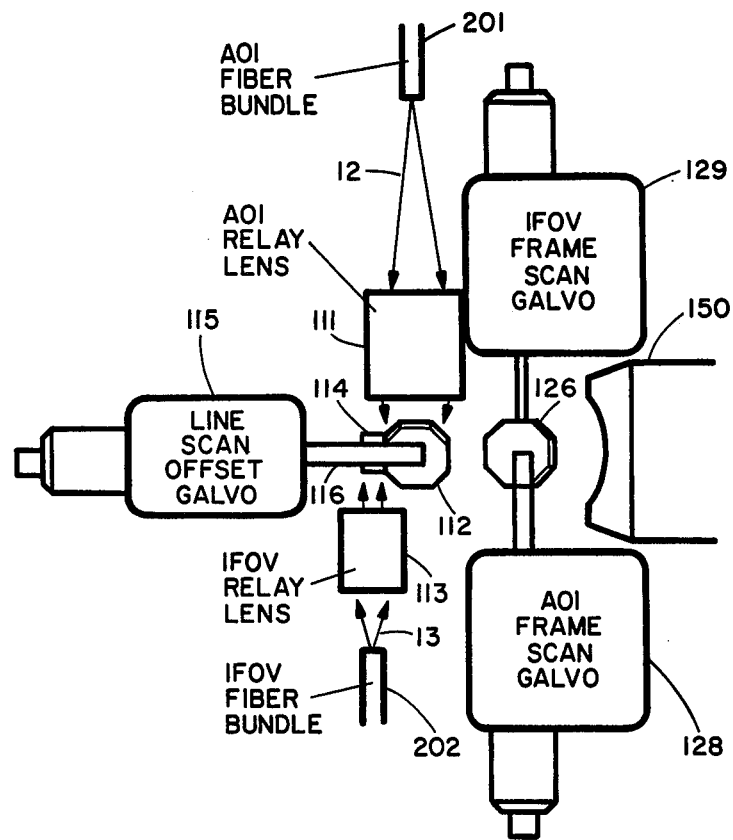
FIG. 2 is a top view of the invention up to the line offset mirrors.

FIG. 2 is a top view of deflector assembly 110 wherein an AOI relay lens 111 is positioned to transmit the AOI line scan 12 from AOI fiber optic bundle 201 to an AOI line scan offset mirror 112. An IFOV relay lens 113 is similarly positioned to transmit the IFOV line scan 13 to an IFOV line scan offset mirror 114.

Line scan offset mirrors 112 and 114 are both positioned on a single shaft 116 of a line offset galvanometer 115 such that the two line scans 12 and 13 can be simultaneously shifted along their own length. This produces a line direction shift of the two rasters, normally a horizontal shift, which is used primarily for following horizontal eye movements. The amount of offset is determined by signals to galvanometer 115 from the CIG which has, in turn, received eye position information from the eye attitude sensor.

Figure 3:
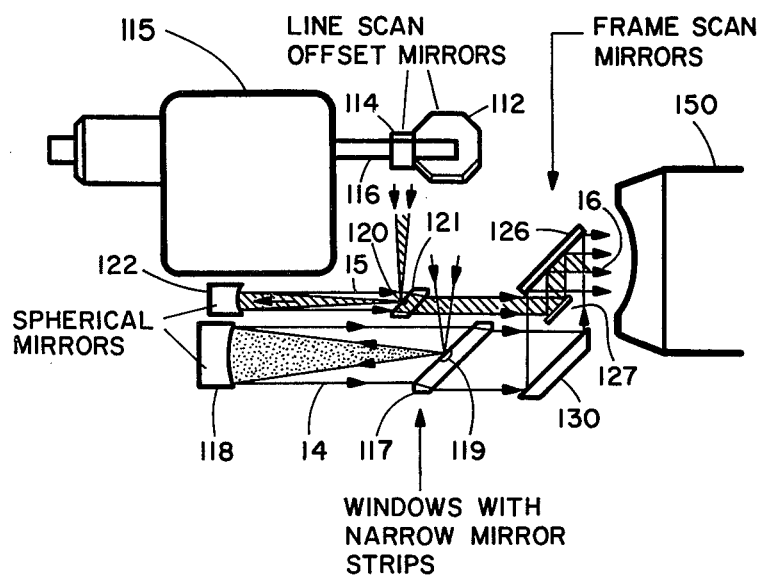
FIG. 3 is a side view of the invention from the line offset mirrors to the frame scan mirrors.

Referring to FIG. 3, scan line 12 is then folded at a narrow strip of flat mirror 119 on an AOI window 117 located at a line scan image. The light reflected therefrom is recollimated into an AOI beam 14 by an AOI spherical mirror 118 and relayed through window 117 to AOI frame scan mirror 130.

Likewise, scan line 13 is then folded by strip mirror 120 on IFOV window 121, recollimated into beam 15 by IFOV spherical mirror 122, and relayed to IFOV frame scanning mirror 127 via window 121.

Two flat mirrors 126 and 127, driven by separate galvanometers 128 and 129, provide frame scan and also combine the two beams 14 and 15 onto a common optical axis 16. A stationary flat folding mirror 130 is placed in AOI beam 14. AOI beam 14 is deflected at a single galvanometer driven mirror 126, which produces a cyclic linear ramp scan required for the AOI raster. IFOV beam 15 is first deflected at a small galvanometer driven mirror 127, which generates cyclic linear ramp scan to produce three-fourths of the frame dimension for the IFOV raster. IFOV beam 15 then falls on AOI mirror 126 which adds frame scan to complete the IFOV raster.

The two beams are effectively combined at the small IFOV mirror 127. IFOV beam 15 is reflected from it, while AOI beam 14, which has a large diameter, passes around the mirror with partial obscuration by it.

IFOV frame scan galvanometer 129 and AOI frame scan galvanometer 128 receive their deflection control signals from the system CIG. Controlled offset of the rasters in the frame direction is provided by an offset only at AOI mirror 126. Since both beams 14 and 15 are deflected along optical axis 16 at this mirror, the two rasters are deflected together. The offset is used primarily to follow vertical eye rotation.

Deflector assembly 10 will be located on top of the observer's helmet. The raster images generated at this point will have moderate field angles, AOI and IFOV line lengths being respectively 11° and 44°.

Light energy from deflection assembly 110 is relayed by the projection optics assembly 150 to an exit pupil located in front of the pilot's forehead, approximately 30 mm above his eye level and 70 mm forward of his eyes. Projection optics assembly 150 is a complex lens and mirror telescopic system which will provide angular magnification and direct the combined raster images outward onto the domed display screen.

The final lenses of the projection optics assembly 150 produce substantial pincushion distortion, corrected in the system CIG, which is useful in distributing resolution optimally across the projected field.

By allowing the helmet mounted optics 10 to be relatively complex, certain advantages in the overall simulation system are realized. Examples of such advantages are: relaxing the specification for the fiber optic bundles by minimizing the length of the AOI line scan image carried thereby, since the line scan offsetting assembly 110 is on the helmet; the fiber optics bundles of the overall system do not require such exacting standards; by using a complex lens system with angular magnification, the frame scanners can use existing galvanometers.

While a preferred embodiment has been shown and described, various modifications and substitutions may be made thereto without departing from the spirit and scope of the appended claims. Accordingly, it will be understood that the present invention has been described by way of illustration rather than limitation.

What is claimed is:

1. An improved apparatus for visual simulation utilizing a domed retroreflective screen, a dual channel computer image generator, with one channel dedicated to a high resolution area of interest and a second channel dedicated to a lower resolution instantaneous field of view, a laser modulation and line scanning system for outputting a plurality of laser line scans in accordance with said computer image generator channels, a plurality of flexible coherent fiber optic bundles for transmitting said line scans, a projector housing operably connected to said fiber optic bundle, and a helmet to be worn on an observer's head adapted for mounting said housing thereon, wherein said improvement comprises:
   an optical system mounted within said projector housing comprising,
   means for generating frame scan for each projected laser line scan, connected to receive transmission from said laser modulation and line scanning system via said fiber bundles, said generating means including means for combining said laser line scans in a single projected frame such that a projected image is formed having a high resolution area of interest bounded by a lower resolution instantaneous field of view;
   means for controlling said scan generating means operably connected to receive control signals from said computer image generator; and
   means for projecting said laser raster through a wide angle onto said domed screen operably positioned to receive said raster from said scan generating means.

2. An apparatus according to claim 1, wherein said helmet mounted optical system further comprises means for offsetting said line scan along its own length, operably connected to receive said line scan from said fiber optic bundle and receiving control signals from said computer image generator.

3. An apparatus according to claim 2, wherein said helmet mounted optics further comprise:
   relay lenses for transmitting said line scan from said fiber optic bundle to said scan generating means, operably positioned to receive said line scan and focus it on said offset means.

4. An apparatus according to claim 1, wherein said projecting means is a complex telescopic lens arrangement configured to form an exit pupil for said rasters immediately in front of said observer's forehead.

5. An improved apparatus for visual simulation utilizing a domed retroreflective screen, a dual channel computer image generator, with one channel dedicated to a high resolution area of interest and a second channel dedicated to a lower resolution instantaneous field of view, a laser modulation and line scanning system for outputting a plurality of laser line scans in accordance with said computer image generator channels, a plurality of flexible coherent fiber optic bundles for transmitting said line scans, a projector housing operably connected to said fiber optic bundle, and a helmet to be worn on an observer's head adapted for mounting said housing thereon, wherein said improvement comprises:
   an optical system mounted within said projector housing comprising,
   means for generating frame scan for each projected laser line scan, connected to receive transmission from said laser modulation and line scanning system via said fiber optic bundles;
   means for controlling said scan generating means operably connected to receive control signals from said computer image generator;

means for projecting said laser raster through a wide angle onto said domed screen operably positioned to receive said raster from said scan generating means;

means for offsetting said line scan along its own length, operably connected to receive said line scan from said fiber optic bundle and receiving control signals from said computer image generator;

relay lenses for transmitting said line scan from said fiber optic bundle to said scan generating means, operably positioned to receive said line scan and focus it on said offset means;

said offsetting means comprising, a line offset galvanometer having an extended shaft, receiving control inputs from said computer image generators;

an instantaneous field of view offset mirror mounted on said shaft and positioned to deflect a laser line scan along its own length; and an ara of interest offset mirror mounted on said shaft and positioned to deflect a laser line scan along its own length in the same manner as said instantaneous field of view offset mirror.

6. An apparatus according to claim 5, wherein said scan generating means comprises:

a plurality of windows having a flat strip mirror at the center thereof, each located at the line scan image of one of said laser line scans;

a plurality of spherical mirrors each associated with one of said windows, positioned so as to receive light reflected from said flat strip mirrors and collimate said light on a path through the associated windows; and a plurality of frame scan mirrors, movably mounted, for providing frame scan, arranged such that the plurality of laser raster scans thus generated are reflected along a common optical axis, each frame scan mirror receiving a laser line scan from one of said spherical mirrors.

7. An apparatus according to claim 6, wherein said generating control means comprises:

a plurality of galvanometers, each connected to one of said frame scan mirrors for displacing said mirrors in accordance with control signals received from said computer image generator.

8. An apparatus according to claim 6, wherein said plurality of frame scan mirrors include:

a larger area of interest frame scan mirror, mounted to produce a cyclic linear ramp scan to provide controlled offset in the vertical direction, deflecting said area of interest laser raster and said instantaneous field of view laser raster; and a smaller instantaneous field of view mirror, mounted to produce a cyclic linear ramp scan for producing three-fourths of the frame dimension for said instantaneous field of view raster, deflecting said instantaneous field of view laser raster onto said area of interest scanning mirror.

* * * * *